(12) United States Patent
Gluck et al.

(10) Patent No.: US 6,575,872 B2
(45) Date of Patent: Jun. 10, 2003

(54) METHOD AND APPARATUS FOR MAKING SMOOTH SHIFTS DURING MODE CHANGES OF AN HMT WHEN USING MECHANICAL CLUTCHES

(75) Inventors: Steven H. Gluck, Cambridge, IA (US); Frederic W. Pollman, Eden Prairie, MN (US)

(73) Assignee: Sauer-Danfoss, Inc., Ames, IA (US)

( * ) Notice: Subject to any disclaimer, the term of this patent is extended or adjusted under 35 U.S.C. 154(b) by 0 days.

(21) Appl. No.: 10/053,887

(22) Filed: Jan. 18, 2002

(65) Prior Publication Data

US 2002/0094909 A1 Jul. 18, 2002

Related U.S. Application Data

(60) Provisional application No. 60/262,327, filed on Jan. 18, 2001.

(51) Int. Cl.$^7$ ............................................... F16H 61/40
(52) U.S. Cl. ........................................................ 477/68
(58) Field of Search ................................... 477/68, 69

(56) References Cited

U.S. PATENT DOCUMENTS

| 4,341,131 | A |   | 7/1982  | Pollman |         |
|-----------|---|---|---------|---------|---------|
| 5,040,114 | A | * | 8/1991  | Ishikawa et al. | 477/68 |
| 5,146,812 | A | * | 9/1992  | Nikolaus et al. | 477/68 |
| 6,471,619 | B2| * | 10/2002 | Nanri et al. | 477/68 |

* cited by examiner

Primary Examiner—Dirk Wright

(57) ABSTRACT

A method to provide a smooth shift during mode changes of an HMT when using mechanical clutches by reducing the power into the transmission momentarily when a shift is initiated by cutting fuel to the engine, and also reducing power in the hydrostatic transmission by crossporting the fluid circuit, and then reapplying power to both the engine and the transmission after the clutch has been shifted.

6 Claims, 8 Drawing Sheets

METHOD AND APPARATUS FOR MAKING SMOOTH SHIFTS DURING MODE CHANGES OF AN HMT WHEN USING MECHANICAL CLUTCHES

CROSS REFERENCE TO RELATED APPLICATION

This application is a conversion of Provisional Patent Application Serial No. 60/262,327 filed Jan. 18, 2001.

BACKGROUND OF THE INVENTION

A hydromechanical transmission uses parallel hydrostatic transmission and mechanical power paths in order to reduce the amount of hydrostatic power transmitted. This typically results in a narrow output speed range which is extended by shifting or "changing modes". Multi-mode hydro mechanical transmissions are typically shifted with the clutch elements at a nominal "synchronous" speed condition in order to maintain a continuous input/output speed and torque ratio through the shift. In practice, a smooth shift may not result as the power in the hydrostatic transmission needs to reverse direction during the shift. When reversing the HST power and also maintaining the same nominal synchronous speed of the HST units through the shift, the power direction reversal is accomplished by reversing the direction of hydrostatic pressure in the closed loop. This requires the leakage losses to reverse which must be accompanied by a change in at least one hydrostatic unit's speed or displacement. Decreasing the time required for this required change in unit speed or displacement has a major impact on improving the quality, or smoothness of the shift.

As disclosed in U.S. Pat. No. 4,341,131 the fastest power reversals are accomplished by making a slightly pre-synchronous" power-shift and using the engine and vehicle inertia to increase the speed of the fixed hydraulic unit during the shift. The most desirable shift is one in which the variable unit angle is substantially equal before and after the shift, after accounting for pressure and speed differences needed to reverse the HST power flow. This is the quickest and smoothest shift, as far greater power is available to change F-unit speed than V-unit displacement. Pre-synchronous power-shifts typically are done with friction clutches as they are designed to be applied in the presence of a speed differential. However, friction clutches are more expensive than mechanical clutches, and they are more difficult to package effectively. Also, they are not as versatile when accommodating variations in transmission configuration. Mechanical clutches are typically not suitable for making power-shifts with a differential speed, as they cannot slip and the power flow would change too abruptly.

It is therefore a principal object of this invention to provide a method to make smooth shifts in an HMT with mechanical clutches by reducing the speed differential, and momentarily reducing power flow during the shift and then reapplying it before the shift ends.

A further object of the invention is to provide a smooth shift during mode changes of an HMT when using mechanical clutches.

These and other objects will be apparent to those skilled in the art.

SUMMARY OF THE INVENTION

A method and apparatus for providing a smooth shift during mode changes of an HMT when using mechanical clutches involves reducing the power into the transmission momentarily when a shift is initiated by cutting fuel to the engine, and also reducing power in the hydrostatic transmission by crossporting the fluid circuit, and then reapplying the power to both the engine and transmission after the clutch has been shifted. The shift sequence also facilitates the initial clutch element speed differential to be reduced by about half as the control allows hydrostatic leakage reduction to increase F-unit speed. During the shift, the F-unit changes speed in an amount required to reverse the direction of power flow and losses in the HST without substantially changing the V-unit displacement.

BRIEF DESCRIPTION OF THE EMBODIMENTS OF THE INVENTION

Figure 2:
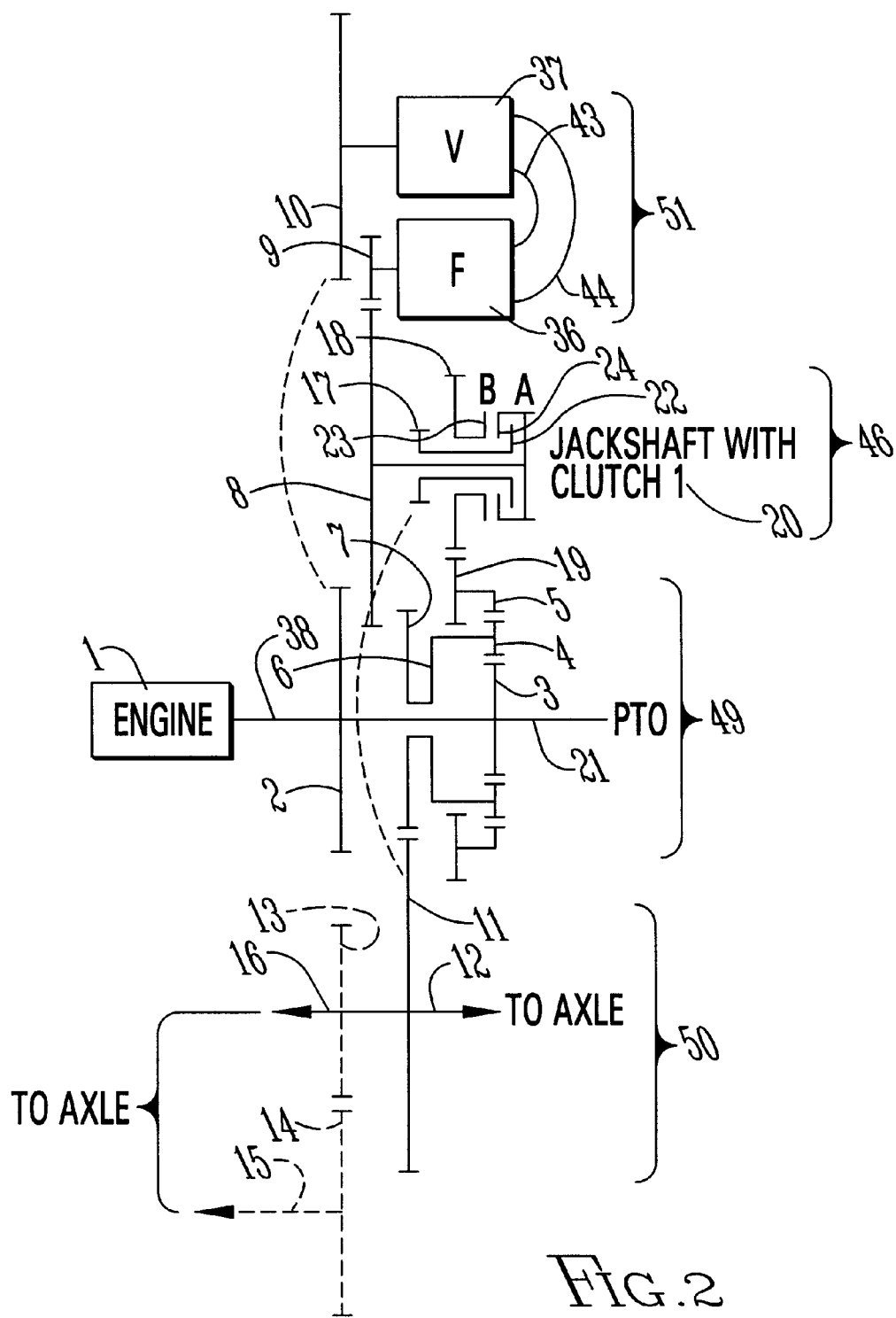
FIG. 2 is a schematic drawing of a two-mode HMT.

A 2-mode hydromechanical transmission which has one mode change is shown in FIG. 2. There is a hydrostatic transmission 51, a jackshaft 46 with a mechanical clutch 20, a planetary 49 and output shaft 50. The HMT comprises a fixed swashplate control (F-unit) operatively connected to a variable swashplate control (V-unit). The HMT starts in a hydrostatic mode of operation with clutch 20 in position A. In this position, a tang in slider 24 is drivingly engaged in slot 22 of an extension of gear 17. Power is transmitted from engine 1 through gear set 2/10, from HST 51 through gear set 9/6, from jackshaft 46 through gear set 17/11 to output 50. In mode 2, power must be transmitted through HST 51 and through planetary 49. Clutch 20 must be in position B to accomplish this.

The shift sequence is initiated by a signal when the end of mode 1 of the HMT has been reached. This preferably is done with a displacement signal from the V-unit 37 such as swashplate position sensor 55-1, but may also be done with V and F-unit speed and pressure signals. At this time, the F-unit 36 is running slower than the V-unit 37 (assuming equal displacement units). The amount of speed differential is dependent on the power being transmitted and the sizing of the transmission 51, but would typically be less than 15%. The controller 63 would immediately stop fuel supply to engine 1 through controller 61 which stops the delivery of power and the tendency for the engine speed to increase during the shift sequence. Clutch 20 is then disengaged from the power source in the transmission by signaling valve 53. Cylinder 52 moves yoke 56 and slider 24 to disengage tang 24-1 from slot 22. As power is flowing in a positive direction, F-unit 36 is acting as a motor and the loop pressure decrease in line 43 will allow F-unit 36 to increase its speed to be substantially equal to V-unit 37 as soon as clutch 20 is disengaged. After F-unit 36 speeds up and loop pressure in line 43 is low, control 63 engages crossport valve 56 to enable differential flow across the loop and differential speed between F-unit 36 and V-unit 37 with low pressure drop. Control 63 then engages clutch 20 to position B by further moving slider 24 with yoke 56 and cylinder 52. This engages tang 24-2 with slot 23 and enables drive of gear set 18/19. While there is a differential speed between tang 24-2 and slot 23, the engagement is made at a reduced differential speed and low power condition. During engagement, clutch 20 speeds up the F-unit 36 to a plus-synchronous amount as it must act as a pump after the completion of the shift. Transmission elements are sized to allow for the correct amount of speed differential to permit the displacement of V-unit 37 to remain nearly constant before and after the shift. Control 63 then restores engine fuel with controller 61 and closes loop crossport valve 56. Valve 56 is always open or closed. If it is open, no power results. This is the meaning of the term "crossport". Power delivery resumes in mode 2 with the power flow in HST 51 reversed and the transmission ratio remaining unchanged.

Figure 1:
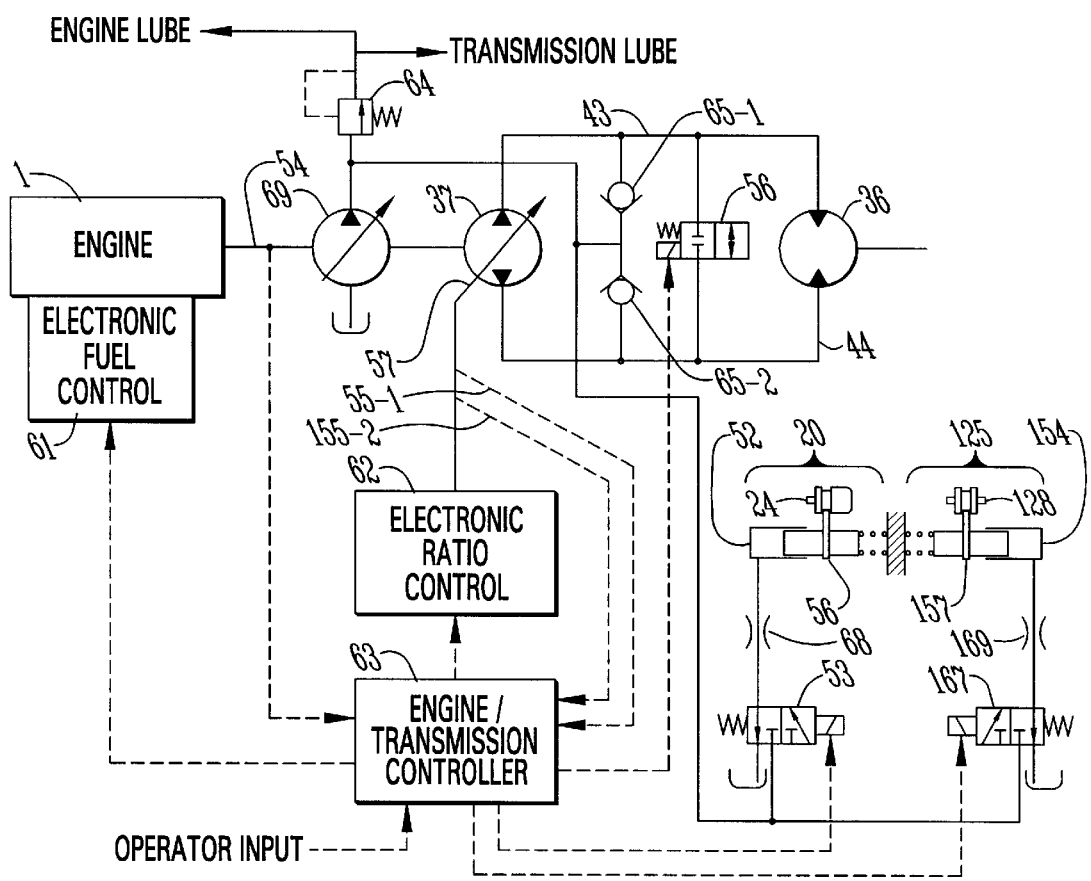
FIG. 1 is a schematic drawing of the HMT/Engine circuit integration of this invention.

FIG. 1 shows only one shift valve for each clutch for sequencing the slider with the crossport valve. The shift sequence is completed in a fraction of a second and would be done on a timed basis. Flow control orifice 68 and 169 are used to regulate the speed of cylinder 52 and 154 in order to time the shift functions properly. It should be noted that it could also be done on an event tracking basis which would require the addition of a second shift valve to control the position of the slider midway between its engagement points, and sensors to monitor the shift events.

Figure 3:
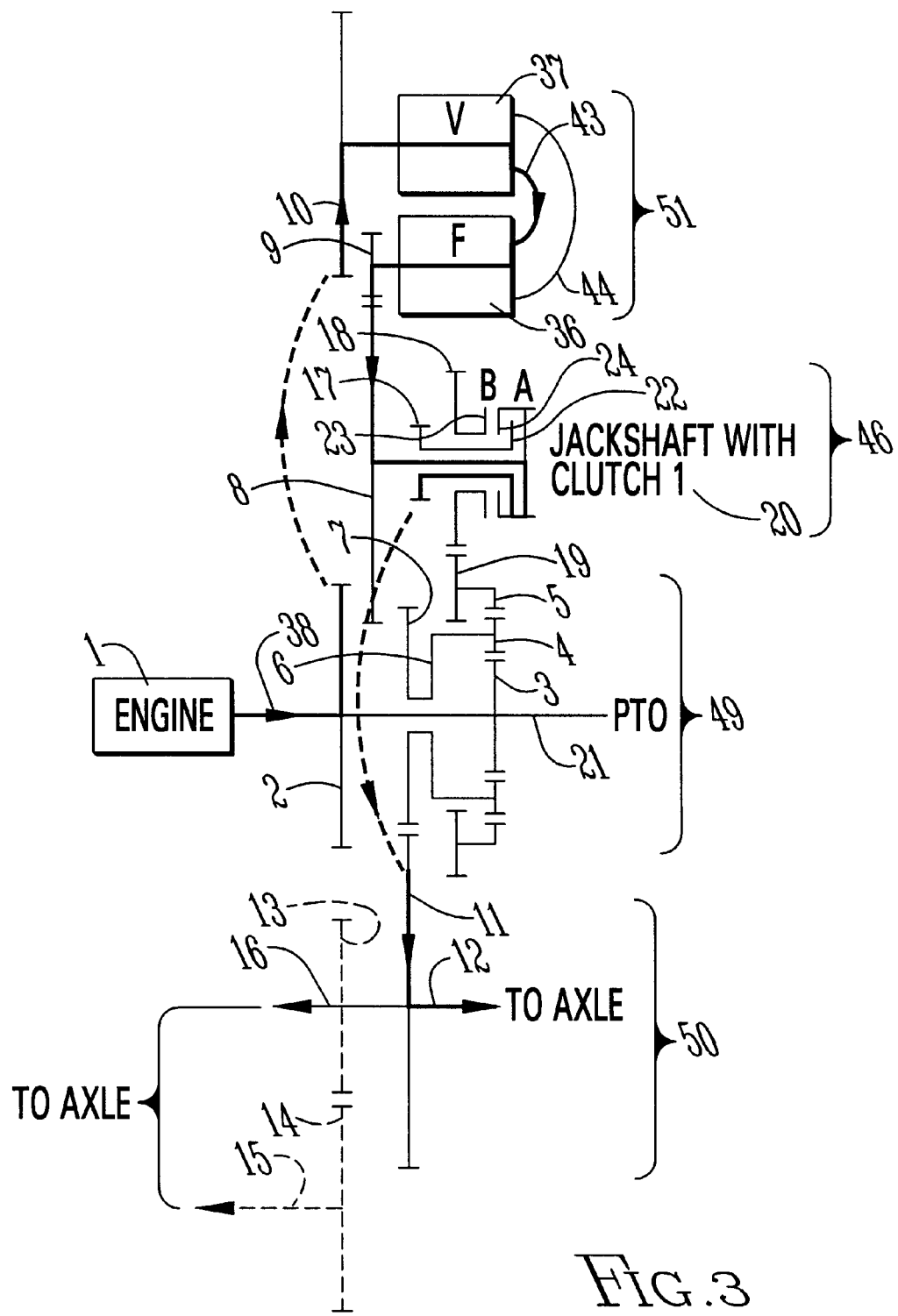
FIG. 3 is a schematic drawing showing a first mode for the circuit of FIG. 2.
Figure 4:
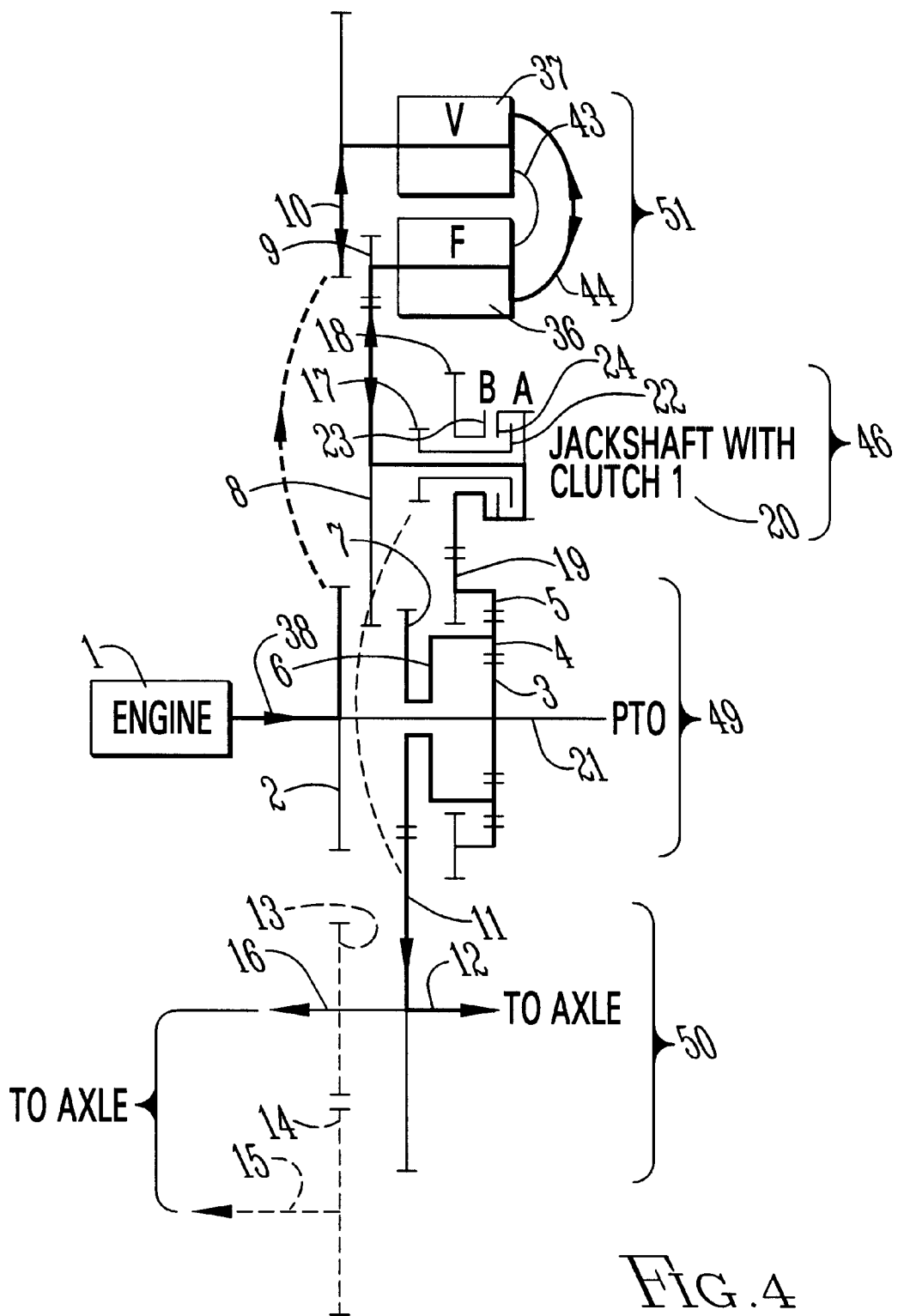
FIG. 4 is a schematic drawing showing a second mode for the circuit of FIG. 2.
Figure 5:
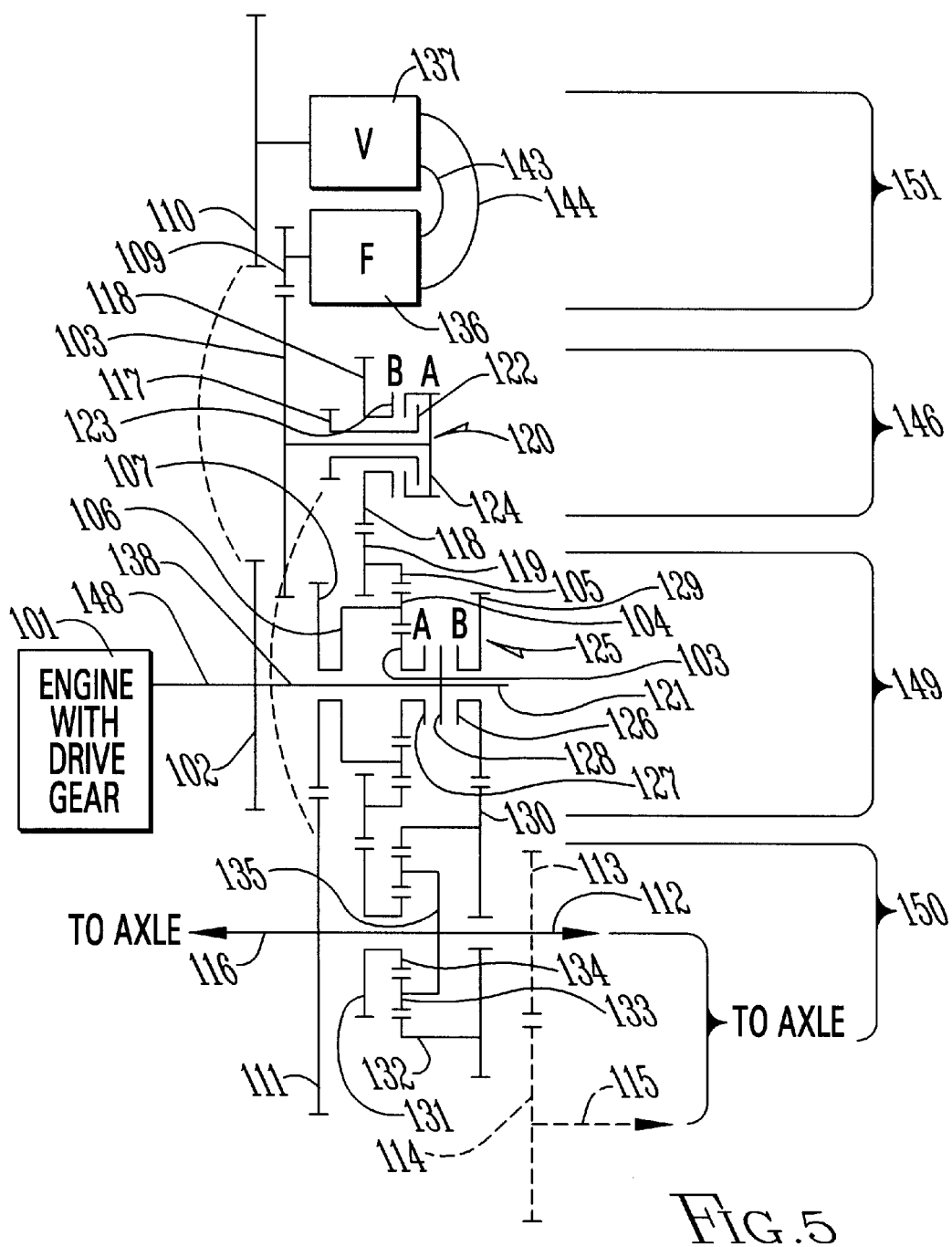
FIG. 5 is a schematic drawing of a 3-mode HMT.
Figure 6:
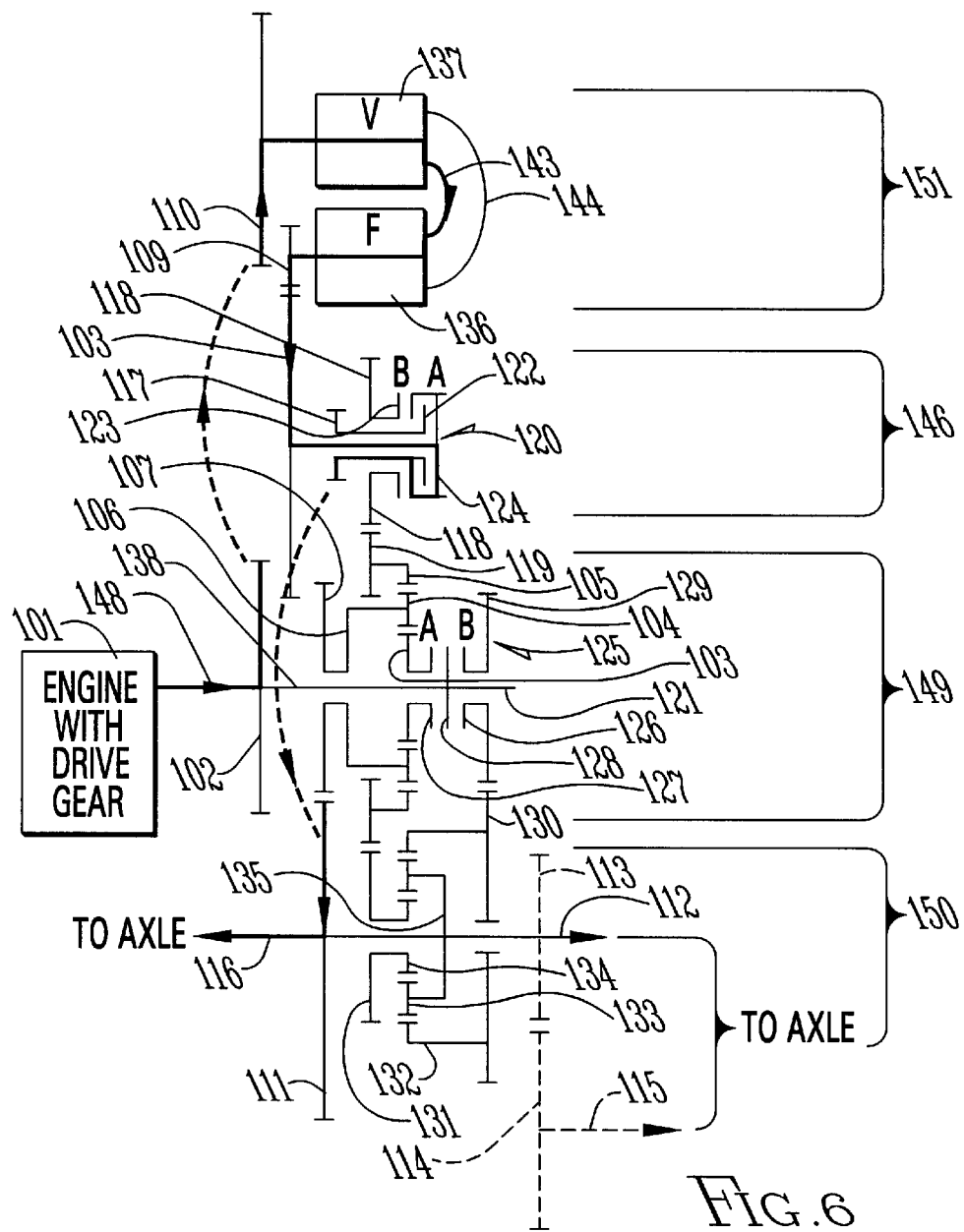
FIG. 6 is a schematic drawing showing a first mode for the circuit of FIG. 5.
Figure 7:
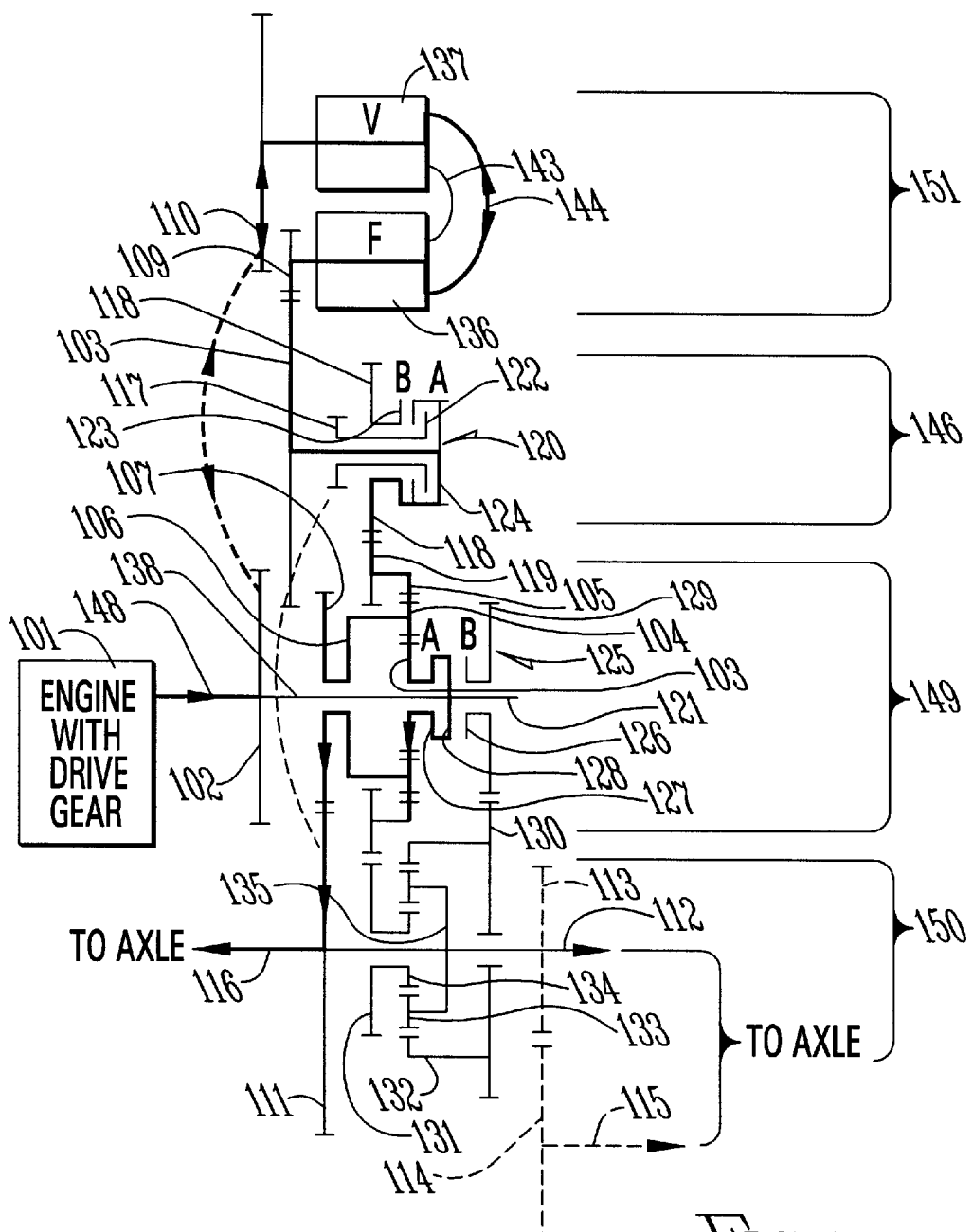
FIG. 7 is a schematic drawing showing a second mode for the circuit of FIG. 5.
Figure 8:
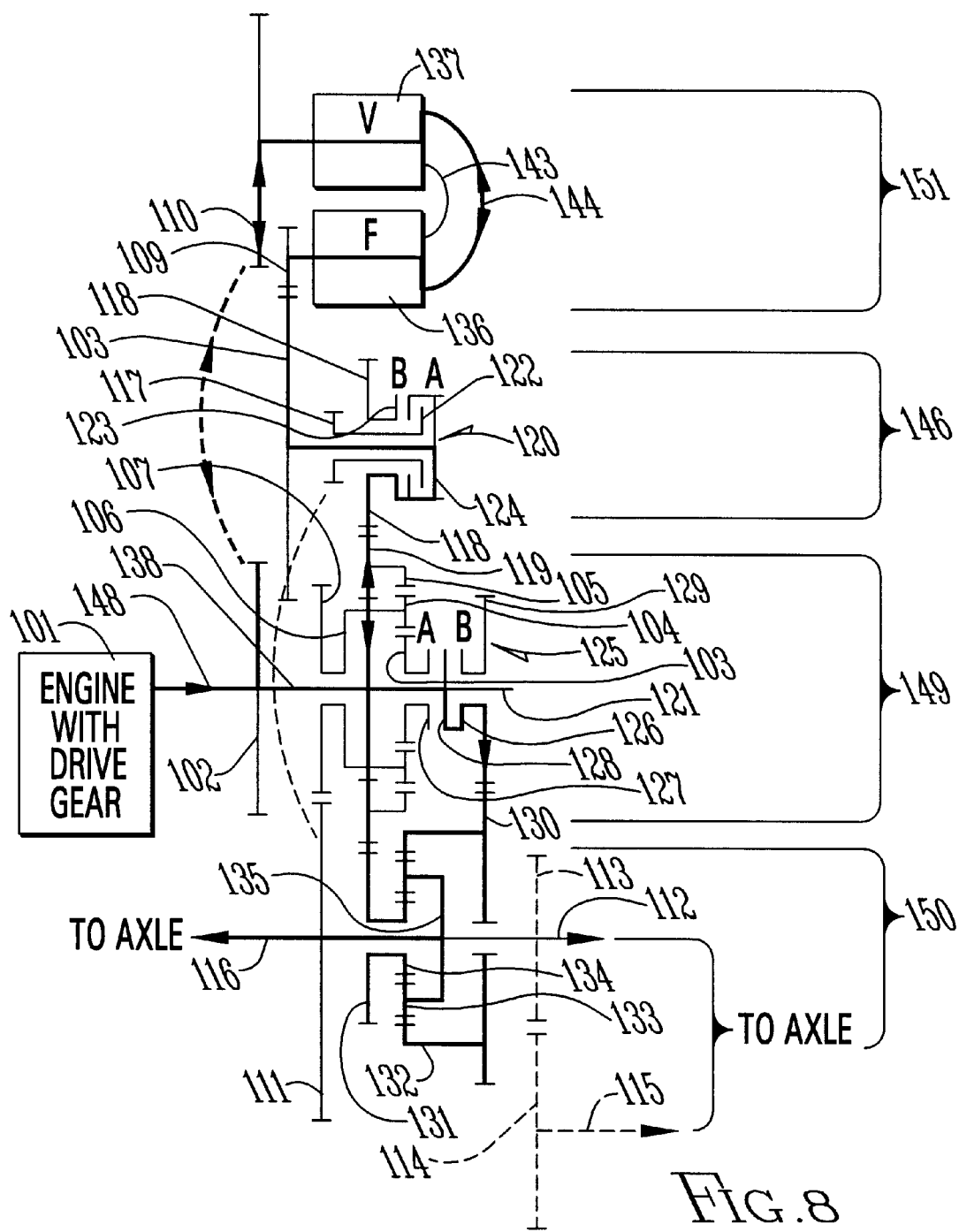
FIG. 8 is a schematic drawing showing a third mode for the circuit of FIG. 5.

Additional modes can be accommodated with the addition of additional clutches and shift actuators. See FIGS. 3–8. See the three mode system in FIG. 5 with planetary 149 and clutch 125. The numerals in FIG. 5 correspond to the numerals in FIGS. 2–4 except that the numerals in FIG. 5 have been increased by a value of 100. Thus, the component 50 in FIGS. 2–4 is 150 in FIG. 5. A additional clutch actuator is accomplished with cylinder 154 and slider 128. The shift sequence is same as for the mode 1 to 2 shift.

It is therefore seen that this invention will achieve at least all of its stated objectives.

We claim:

1. A method of making smooth shifts in an HMT with mechanical clutches, comprising, reducing power into the HMT momentarily when a shift is initiated by cutting fuel to an engine powering the HMT, reducing hydraulic power in the HMT by crossporting a fluid circuit therein, and then reapplying power to both the engine and the HMT after the clutch has been shifted.

2. The method of claim 1 wherein an absence of power allows clutch element speed differential associated with the clutch to be reduced by about half through reduced hydrostatic fluid leakage in the HMT and increased speed of an F-unit in the HMT.

3. The method of claim 2 wherein the F unit changes speed during the shift to reverse the direction of power flow losses in the HMT without substantially changing displacement of a V-unit of the HMT.

4. A shift control system for a hydromechanical transmission (HMT) with mechanical clutches, comprising, means for reducing power into the HMT momentarily when a shift is initiated by cutting fuel to an engine powering the HMT, means for reducing hydraulic power in the HMT by crossporting a fluid circuit therein, means for reapplying power to both the engine and the HMT after the clutch has been shifted.

5. The system of claim 4 wherein an absence of power allows clutch element speed differential associated with the clutch to be reduced by about half through reduced hydrostatic fluid leakage in the HMT and increased speed of an F-unit in the HMT.

6. A shift control system for a hydromechanical transmission (HMT) with mechanical clutches, comprising, means for reducing hydraulic power in the HMT by crossporting a fluid circuit therein, means for reapplying power to both the engine and the HMT after the clutch has been shifted.

\* \* \* \* \*